United States Patent
Takamoto et al.

[11] Patent Number: 6,012,474
[45] Date of Patent: *Jan. 11, 2000

[54] MASS FLOW CONTROL METHOD AND DEVICE UTILIZING A SONIC NOZZLE

[75] Inventors: Masaki Takamoto, Ibaraki; Shinichi Nakao, Kanagawa; Masahiro Ishibashi, Ibaraki; Yoshitaka Ina; Yoshikazu Yokoi, both of Kanagawa; Masao Hayakawa, Tokyo, all of Japan

[73] Assignee: Hirai Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/850,895

[22] Filed: Jul. 24, 1997

[51] Int. Cl.[7] ............................. F16K 24/04; F17D 1/16
[52] U.S. Cl. ..................... 137/14; 137/486; 137/487.5
[58] Field of Search ........................... 137/487.5, 14, 137/186; 73/861.61, 861.63, 861.52, 861.03

[56] References Cited

U.S. PATENT DOCUMENTS

| | | |
|---|---|---|
| 3,910,113 | 10/1975 | Brown . |
| 3,918,305 | 11/1975 | Benedict ........................... 73/861.61 |
| 4,149,254 | 4/1979 | Molusis ........................... 73/861.03 X |
| 4,406,161 | 9/1983 | Locke et al. .................... 73/861.52 X |
| 4,796,651 | 1/1989 | Ginn ................................. 137/487.5 |
| 4,836,233 | 6/1989 | Milgate ............................ 137/487.5 |
| 4,926,698 | 5/1990 | Owen ................................ 73/861.61 |
| 5,365,795 | 11/1994 | Brower .......................... 73/861.63 X |
| 5,566,709 | 10/1996 | Fujii ................................ 137/487.5 |
| 5,669,408 | 9/1997 | Nishino ........................... 137/487.5 |
| 5,736,650 | 4/1998 | Hiron et al. ..................... 73/861.63 |

Primary Examiner—Denise L. Ferensic
Assistant Examiner—Joanne Y. Kim
Attorney, Agent, or Firm—Burns, Doane, Swecker & Mathis LLP

[57] ABSTRACT

A control circuit (20) of a mass flow control device (1) retains the relation (Cd=f(ReTH)) between the Reynolds number and the actual discharge coefficient of a sonic nozzle (13) in the area where the Reynolds number is small. In such an area, the sonic nozzle can be used as a variable mass flow element for controlling mass flow rate. If a pressure Pu and a temperature Tu of an upstream fluid of the sonic nozzle 13 are detected, the theoretical mass flow rate QmTH and the theoretical Reynolds number ReTH can be calculated; since the actual discharge coefficient Cd can be calculated by the above relationship Cd=f(ReTH) based on the calculated Reynolds number, the actual mass flow rate Qm can be calculated based on the relation of Qm=Cd·QmTH. In the control circuit 20, in order to obtain the predetermined mass flow rate Qm, the upstream fluid pressure Pu and temperature Tu of the sonic nozzle are obtained based on the above relationship, and a variable valve (12) is driven so that the mass flow rate may have this value. Since the properties of the sonic nozzle can be made full use of, it is possible to control trace amounts of mass flow rate with extremely high accuracy.

13 Claims, 3 Drawing Sheets

MASS FLOW CONTROL METHOD AND DEVICE UTILIZING A SONIC NOZZLE

BACKGROUND OF THE INVENTION

1. Field of the Invention

This invention relates to a mass flow control method and device utilizing a sonic nozzle.

2. Related Art Description

In recent years as a variety of industries have developed, there has been an increasing need for controlling mass flow rate, and in many fields manufacturing and the like cannot be done properly unless mass flow rate can be controlled accurately. For example, in the field of semiconductor industry, as the fine processing technique developed, high integration also progressed, and as a semiconductor manufacturing process becomes subdivided, the control of a thin film developed on a wafer is becoming more important. It is possible to control the thin film growth by controlling trace amounts of process gas flow. Accordingly, in order to control the flow rate of fluids such as process gas and the like used in such a manufacturing process, not only reproducibility and stability but also mass flow rate as a precise absolute value is required. At present, the flow of fluids such as process gas and the like is mostly controlled by means of a thermal mass flow meter. However, if a conventional mass flow meter is used to control mass rate of flow, in some cases trace amounts of flow cannot be expected to be controlled accurately and correctly at a due level.

A sonic nozzle is employed for a mass flow meter. Generally, the sonic nozzle is used in the medium flow range of about 50/min. or more in mass flow rate. The sonic nozzle has a fixed discharge coefficient and the degree of variability thereof is 0.1% or less in the area where the Reynolds number is $10^6$ or more. By forming a sonic flow with the relation between an upstream fluid pressure and a downstream fluid pressure kept less than the critical pressure ratio, it is possible to supply a fluid at a fixed mass flow rate irrespective of fluid conditions such as the downstream fluid pressure, temperature, and the like, whereby a fixed mass flow rate can be set in a manner extremely accurately. In the area where the Reynolds number is smaller than $10^6$, however, the discharge coefficient greatly varies non-linearly; and in the above-mentioned area, namely, in the area where a flow rate is extremely low, no sonic nozzle is utilized.

SUMMARY

Paying attention to the area where the Reynolds number is small, which was not regarded as an area where a sonic nozzle can be used, the inventors found that a sonic nozzle can be used not as a constant flow element but as a variable flow element.

Taking the above possibility into consideration, the object of this invention is to realize a flow control method and device which, by using a sonic nozzle in the area where the Reynolds number is small, enable trace amounts of flow to be controlled more accurately than before.

For the purpose of achieving the aforementioned object, in a mass flow control method making use of a sonic nozzle according to this invention, a sonic nozzle is connected in series in a fluid path communicating between a fluid supply source and a side to which a fluid is supplied, the ratio of a downstream fluid pressure (Pd) and an upstream fluid pressure (Pu) of the sonic nozzle is maintained lower than a critical pressure ratio, an actual discharge coefficient (Cd) corresponding to the Reynolds number (ReTH) based on a throat diameter of the sonic nozzle is obtained by a calibration test, and the upstream fluid pressure (Pu) or an upstream fluid temperature (Tu) of the sonic nozzle is changed based on the aforementioned relation, so that the mass flow rate of a fluid flowing through the sonic nozzle is controlled so as to be the desired flow rate (Qm).

Incidentally, although only one sonic nozzle may be used, in order to widen the control range, a number of sonic nozzles with the same diameter or different diameters may be connected in parallel to the fluid path.

The method according to this invention is particularly suitable for controlling trace amounts of flow, and is employed in the area where the Reynolds number is less than $10^6$. Particularly, this method can be applied in the area where the Reynolds number is $10^4$ or less.

While, a mass flow control device according to this invention, which is an embodiment of the aforementioned method, comprises a sonic nozzle which is connected in series in a fluid path to supply a fluid supplied from a fluid supply source to a side to which the fluid is supplied; a pressure detection means which detects an upstream fluid pressure (Pu) and a downstream fluid pressure (Pd) of the sonic nozzle; a temperature detection means which detects an upstream fluid temperature (Tu) of the sonic nozzle; a memory means which stores a correspondence between the Reynolds number (ReTH) based on a predetermined throat diameter of the sonic nozzle and an actual discharge coefficient (Cd); a change means which can change at least one of the upstream fluid pressure and the density of the sonic nozzle; and a control means which controls the change means so as to obtain a desired mass flow rate.

In this case, it is also possible to control a wider range of flow by providing a number of sonic nozzles in parallel. That is, the flow can be controlled in areas covering trace amount flow rate to medium amount flow rate.

Since a sonic nozzle is used in the method and device according to this invention, it is possible to control flow rate irrespective of fluid conditions of the lower stream. Further, as it was confirmed that the correspondence between the Reynolds number (ReTH) based on the throat diameter of the sonic nozzle and the actual discharge coefficient (Cd) is reproducible and the degree of variability thereof can be as small as about 0.1%, trace amounts of flow can be controlled with high accuracy. Furthermore, it is possible to control the flow rate reliably because what is required for that purpose is only to change the upstream fluid conditions, and there is no need for a mechanical movable part such as decreasing the nozzle diameter and the like.

BRIEF DESCRIPTION OF THE DRAWINGS

FIG. 2 illustrates a sonic nozzle incorporated in the device shown in FIG. 1, wherein

DETAILED DESCRIPTION OF THE PREFERRED EMBODIMENT

Now an example according to this invention will be described with reference to the attached drawings.

Figure 1:
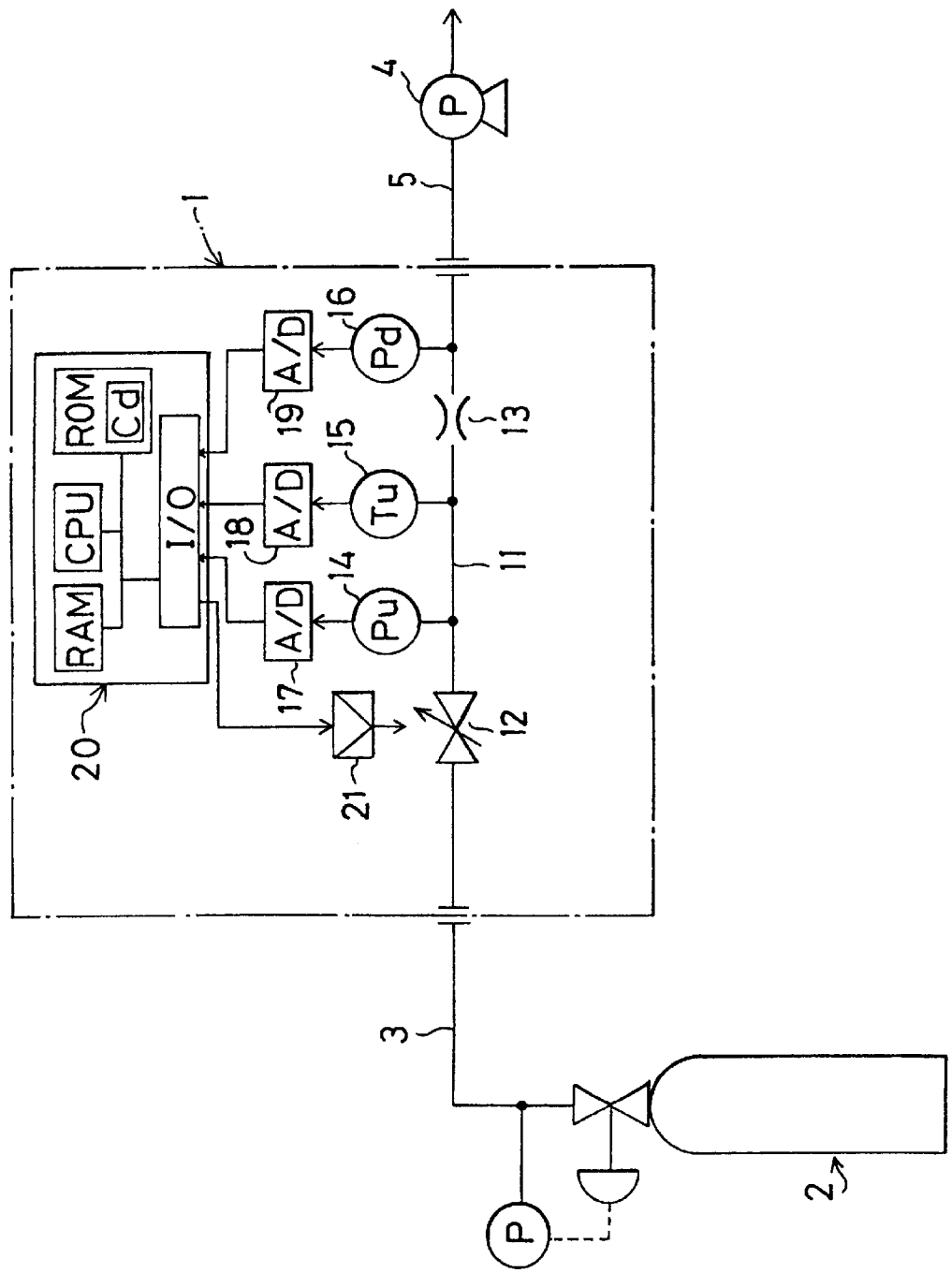
FIG. 1 is a schematic block diagram of an example of a trace amount mass flow control device according to this invention.

FIG. 1 shows a schematic structure of a mass flow control device according to this invention. As shown in the drawing, a mass flow control device 1 of this example is interposed between an upstream pipe 3 connecting with a fluid supply source 2, and a downstream pipe 5 connecting with an intake port of a vacuum pump 4 placed in the lower stream of a fluid supply system.

The mass flow control device 1 has a pipe 11 connected between the upstream pipe 3 and the downstream pipe 5, and the pipe 11 is provided with a variable valve 12 for controlling a pipe pressure and a sonic nozzle 13, in this order from the upper stream side. Upstream of the sonic nozzle 13 are a pressure sensor 14 and a temperature sensor 15 for detecting the pressure Pu and the temperature Tu, respectively, of the upstream fluid, while downstream thereof is a pressure sensor 16 for detecting the pressure Pd of the downstream fluid.

The output of these sensors is digitized through A/D converters 17, 18 and 19, and is input to a control circuit 20 consisting of a microcomputer. The control circuit 20 has CPU, ROM, RAM, and the like, executes a control program prestored in the ROM based on the sensor output which is input through an I/0 port, and controls the variable valve 12 through a driver 21 to change the upstream fluid pressure Pu of the sonic nozzle 13 so that the mass flow of the fluid supplied to the lower stream through the sonic nozzle 13 may be a predetermined mass flow rate.

Figure 2A:
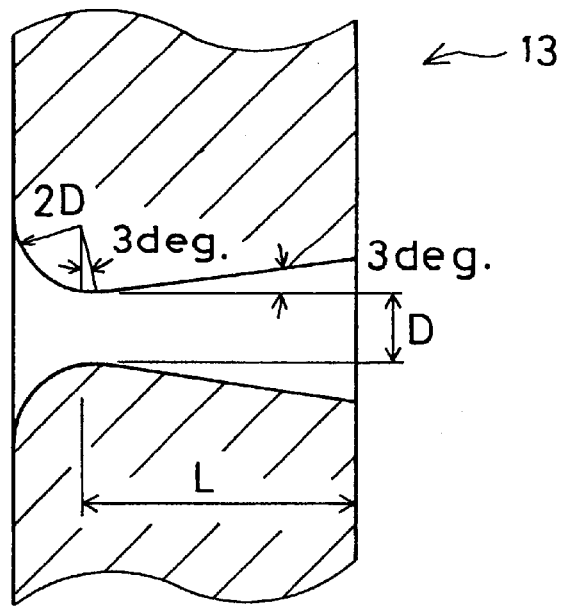
FIG. 2(a) is a longitudinal sectional view thereof and FIG. 2(b) is a longitudinal sectional view of the sonic nozzle in a condition attached to a holder.
Figure 2B:
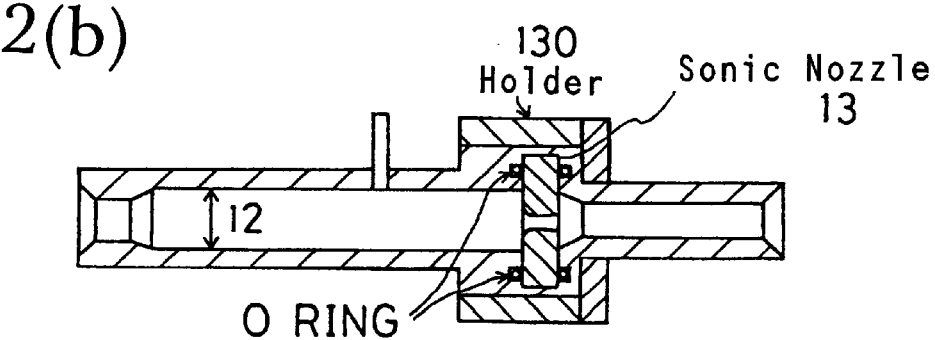

As the sonic nozzle 13, an ISO toroidal throat type sonic Venturi nozzle, for example, may be used, and the nozzle section thereof is shown in FIG. 2(a). The sonic nozzle 13 is used in a condition attached to a nozzle holder 130, for example, as the one shown in FIG. 2(b). The throat diameter D of the nozzle 13 appropriate for use in this example is as small as about 0.2 mm to about 0.7 mm. The throat diameter of the conventional sonic nozzle used in the medium amount flow rate area is usually about 2 mm.

Figure 3:
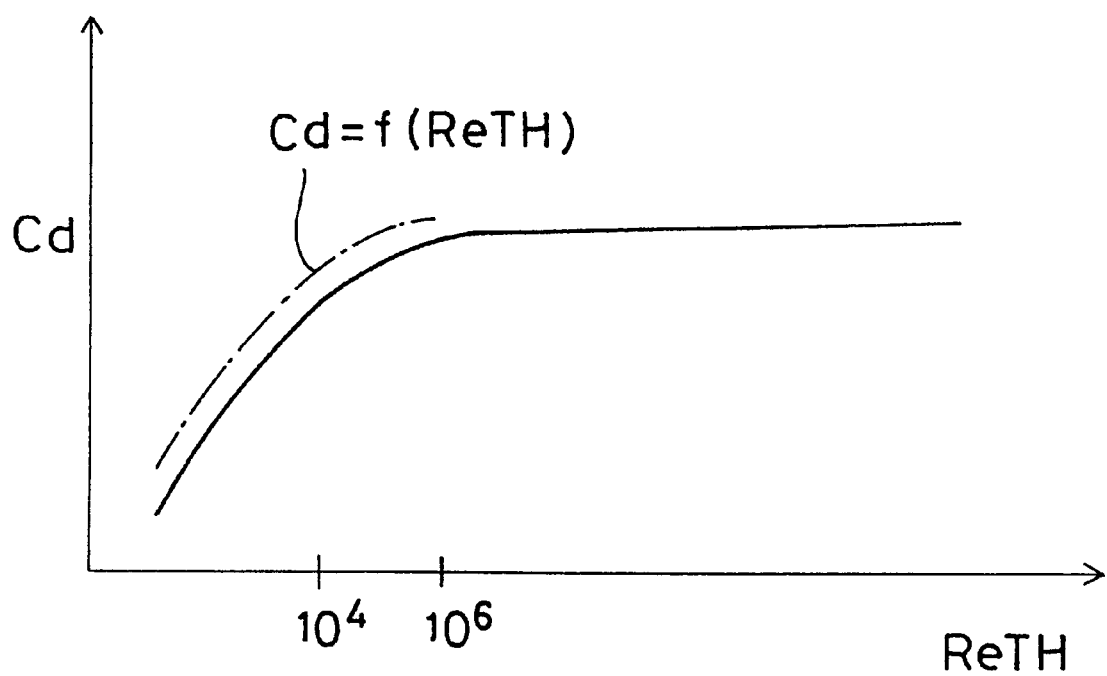
FIG. 3 is a graph indicating the change in the actual discharge coefficient with respect to the Reynolds number of the sonic nozzle.

The critical pressure ratio (Pd/Pu) of the sonic nozzle 13 ranges from 0.5 to 0.6. If the fluid pressure Pu and Pd of the upper stream and the lower stream respectively, are kept so as not to exceed this critical pressure ratio, the discharge coefficient Cd of the nozzle becomes almost constant in the area where the Reynolds number is large, and varies within the range of 0.1%. Incidentally, the discharge coefficient Cd is a ratio of the theoretical mass flow rate QmTH to the mass flow rate Qm actually measured by means of a precision scale. The theoretical mass flow rate is expressed by the following equation:

$$QmTH = a(*) \cdot \rho(*) \cdot A(*) \qquad (1)$$

a(*): sound speed at the throat portion
ρ(*): density at the throat portion
A(*): sectional area of the throat FIG. 3 shows a qualitative change in dependence of the discharge coefficient of the sonic nozzle on the Reynolds number at pressure ratio lower than the critical pressure ratio (for example, Pd/Pu=0.4), which is stabilized by the fluid pressure of the upper stream of the sonic nozzle being controlled to change the Reynolds number ReTH at the throat portion. As is clear from this graph, the discharge coefficient is at a fixed value in the area where the Reynolds number is $10^4$ or more, and normally $10^6$ or more, and the degree of variability is only 0.1%. Accordingly, the sonic nozzle is widely used as a constant mass flow element in the area of medium or larger amount flow rate.

In the area where the Reynolds number is smaller than about $10^4$, the discharge coefficient varies non-linearly as the Reynolds number varies. Accordingly, no sonic nozzle has been used in the so-called trace amount flow rate area. However, if the correspondence between the discharge coefficient and the Reynolds number in the area where the Reynolds number is small, is known, and if the correspondence is reproducible and the degree of variability is as small as 0.1%, a sonic nozzle can be used as a variable mass flow element for controlling mass flow rate. The experiments carried out by the inventors who paid attention to the above possibility proved that it would be possible to find the relation between the Reynolds number and the discharge coefficient in the aforementioned area with high reproducibility and accuracy. That is, the following expression can be obtained:

$$Cd = f(ReTH) \qquad (2)$$

If such a relationship is found beforehand by experiments, when the pressure Pu and the temperature Tu of the upstream fluid of the sonic nozzle are detected, the theoretical mass flow QmTH and the theoretical Reynolds number ReTH can be calculated; based on the Reynolds number thus obtained, the actual discharge coefficient Cd can be calculated by the above relationship Cd=f(ReTH), and the actual mass flow rate Qm can be calculated by the following relationship:

$$Qm = Cd \cdot QmTH \qquad (3)$$

In order to obtain a predetermined mass flow rate Qm, the pressure Pu or the temperature Tu of the upstream fluid of the sonic nozzle may be controlled based on the above relationship (2) (needless to say, both the pressure Pu and the temperature Tu may be controlled). The density can be calculated if the pressure and the temperature are detected.

Now returning to FIG. 1, the mass flow control device 1 of this example will be described. In the ROM of the control circuit 20, the relationship (2) of the Reynolds number and the discharge coefficient obtained by a calibration test by means of the sonic nozzle 13 is prestored in the form of a correspondence table. Accordingly, if the predetermined mass flow rate is input to set through an input portion (not shown), the CPU executes an operation, the upstream pressure Pu and the density ρu, necessary to obtain the predetermined mass flow rate are calculated, and the variable valve 12 is driven so that the preset value of mass flow rate may be obtained.

The thus constituted mass flow control device 1 of this example controls the mass flow rate and especially controls trace amounts of mass flow rate by means of the sonic nozzle 13. In the area where the Reynolds number is small, that is, less than $10^6$, especially $10^4$ or less, since the relationship between the Reynolds number and the discharge coefficient can be found by experiments, which is reproducible and whose degree of variability is extremely small, it is possible to realize a trace amount flow rate control device with extremely high precision. The control device also has an effect that the device can make use of the advantage of the sonic nozzle that the change in such conditions as the pressure, temperature, and the like of the downstream fluid does not affect the mass flow rate. Further, as it is possible to obtain the predetermined mass flow rate only by changing the pressure or temperature of the upstream fluid without using a mechanical movable part, an extremely reliable control device can be realized.

In the above example, only one sonic nozzle is used. However, if one sonic nozzle whose diameter is small is used in the area where the Reynolds number is small, it is impossible to regulate mass flow rate in a wide range. Accordingly, it is generally desirable that a number of sonic nozzles with the same diameter or different diameters be connected in parallel, that an on-off valve be connected in the upper stream thereof, and that fluid of required mass flow rate be supplied to the lower stream selectively using a necessary sonic nozzle. For example, four sonic nozzles whose throat diameter D is 0.2 mm, 0.3 mm, 0.5 mm, and 0.7 mm may be connected in parallel.

While, although a Venturi nozzle is employed in the aforementioned example, it goes without saying that a sonic nozzle with other shapes may be used. While a microcomputer stores the relationship (2) as a digital value in the form of a correspondence table in the above example, the relationship (2) may be generated by means of a function generator and the like, for example.

As was explained above, in the mass flow control method and device according to this invention, the relation of the discharge coefficient of the sonic nozzle on the Reynolds number in the area where the Reynolds number is small is found in advance by experiments, and based on this relation, the pressure and density of the upper stream of the sonic nozzle are regulated so that the predetermined mass flow rate may be obtained. As the above-mentioned relation is reproducible and varies extremely little, trace amounts of mass flow rate can be controlled with extremely high accuracy. The device is practically quite advantageous in that because the sonic nozzle is used, the mass flow rate can be controlled irrespective of variable factors such as the downstream pressure, temperature and others. This device has still another advantage that the mass flow rate can be controlled reliably because the sonic nozzle, which controls the mass flow rate, has no mechanic movable part.

We claim:

1. A mass flow control method comprising the steps of:

connecting a sonic nozzle in series in a fluid path between a fluid supply source and a side to which a fluid is supplied, keeping a ratio of a downstream fluid pressure and an upstream fluid pressure of the sonic nozzle lower than a critical pressure ratio in order to maintain sonic flow through the sonic nozzle, obtaining an actual discharge coefficient corresponding to the Reynolds number based on a throat diameter of the sonic nozzle, and changing at least one of the upstream fluid pressure and a fluid temperature upstream of the sonic nozzle based on the actual discharge coefficient, whereby the mass flow rate of a fluid flowing through the sonic nozzle is controlled so as to be a predetermined mass flow rate.

2. The mass flow control method according to claim 1, wherein the mass flow rate is controlled in an area where the Reynolds number is less than $10^6$.

3. A mass flow control method according to claim 1, wherein the sonic nozzle is a Venturi nozzle.

4. A mass flow control method according to claim 1, wherein the sonic nozzle is a toroidal throat type sonic Venturi nozzle.

5. A mass flow control method according to claim 1, wherein the actual discharge coefficient is obtained by a calibration test.

6. A mass flow control method according to claim 1, wherein an actual mass flow rate is equal to a theoretical mass flow rate times the actual discharge coefficient.

7. A method of controlling a mass flow rate in a fluid path between a fluid supply source and a side to which a fluid is supplied, and having a sonic nozzle in series with the fluid supply source and the side, comprising the steps of:

keeping a ratio of a downstream fluid pressure and an upstream fluid pressure of the sonic nozzle lower than a critical pressure ratio in order to maintain sonic flow through the sonic nozzle, inputting a desired mass flow rate, calculating flow criteria necessary to achieve the desired mass flow rate using the desired mass flow rate and a predetermined actual discharge coefficient that is based on a Reynolds number of the sonic nozzle, wherein the actual discharge coefficient is a ratio of an actual flow rate divided by a theoretical flow rate, setting at least one of the upstream fluid pressure and an upstream fluid temperature based on the calculated flow criteria to achieve the desired mass flow rate.

8. The method of claim 7, further comprising the step of determining an actual discharge coefficient for each of a plurality of Reynolds numbers for a particular nozzle and storing the determined actual discharge coefficients.

9. The method of claim 7, further comprising the step of determining a relationship between the actual discharge coefficient and the Reynolds numbers for a particular nozzle over a range of Reynolds numbers and storing the determined relationship.

10. The method of claim 7, wherein the flow criteria include upstream pressure and density of the fluid.

11. The method of claim 7, wherein the sonic nozzle is a venturi nozzle.

12. The method of claim 7, wherein the sonic nozzle is a toroidal throat type sonic venturi nozzle.

13. The method of claim 7, wherein the actual discharge coefficient is obtained by a calibration test.

* * * * *

UNITED STATES PATENT AND TRADEMARK OFFICE
CERTIFICATE OF CORRECTION

PATENT NO. : 6,012,474
DATED : January 11, 2000
INVENTOR(S) : Masahiro ISHIBASHI et al.

It is certified that error appears in the above-indentified patent and that said Letters Patent is hereby corrected as shown below:

On Title page, item [22], "Jul. 24, 1997" should be --May 2, 1997--.

Signed and Sealed this

Twentieth Day of March, 2001

*Attest:*

NICHOLAS P. GODICI

*Attesting Officer*  *Acting Director of the United States Patent and Trademark Office*